_United States Patent Office_

3,565,897
Patented Feb. 23, 1971

3,565,897
SULFONAMIDES CHARACTERIZED BY
ANTIDIABETIC ACTIVITY
Ruth Heerdt, Mannheim-Feudenheim, Manfred Hübner, Ludwigshafen, Felix Helmut Schmidt, Mannheim-Neuostheim, Kurt Stach, Mannheim-Waldhof, and Karl Muth, Kelkheim, Taunus, Germany, assignors to Boehringer Mannheim, G.m.b.H., a corporation of Germany
No Drawing. Filed Oct. 4, 1968, Ser. No. 765,026
Claims priority, application Germany, Oct. 24, 1967, B 95,111
Int. Cl. C07d 51/42
U.S. Cl. 260—256.5                              7 Claims

ABSTRACT OF THE DISCLOSURE

Novel hydrindene-sulfonylamido-pyrimidines and the alkali salts thereof having blood sugar reducing properties having the formula:

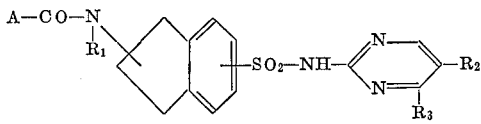

wherein A represents substituted or unsubstituted alkyl, alkenyl, aryl, aralkyl, aryloxyalkyl, arylmercaptoalkyl, cycloalkyl, cycloalkenyl, thienyl, furyl, alkoxy, alkenyloxy, aralkoxy, cycloalkoxy, cycloalkylalkoxy, cycloalkenylalkoxy, or the group

wherein V and W are each hydrogen, substituted or unsubstituted alkyl, cycloalkyl, aryl or aralkyl and taken together with the nitrogen atom to which they are attached a substituted or unsubstituted heterocyclic ring, $R_1$ is hydrogen, lower alkyl or substituted or unsubstituted aralkyl, $R_2$ is alkyl, cycloalkyl, cycloalkyl-alkyl, aryl, aralkyl, alkoxy, cycloalkoxy, alkoxyalkyl, alkoxyalkoxy or alkylmercapto which can be substituted by halogen, hydroxy, or alkyl and $R_3$ is hydrogen or lower alkyl, wherein $R_2$ and $R_3$ can be joined together to form a ring composed of 3 to 5 methylene groups.

This invention relates to novel chemical compounds having useful pharmacological properties. More particularly this invention relates to novel hydrindenesulfonamido-pyrimidines having enhanced and/or prolonged blood sugar reducing activity, and to methods of preparing and using the same.

Substituted 2-benzene-sulfonamido-pyrimidines having blood sugar reducing activity have been described in German patent specification No. 1,147,948; British patent specifications Nos. 913,716 and 939,698; and Belgian patent specifications Nos. 609,270, 622,085, 622,086 and 637,083.

A primary object of the present invention is the development of a new series of therapeutically useful chemical compounds.

A further object of this invention is the development more particularly of a new group of chemical compounds characterized by antidiabetic activity.

A still further object of this invention is the development of a new series of therapeutically useful new chemical compounds capable of reducing blood sugar for a considerable period of time without any incidence of undesirable side effects.

These and other objects and advantages will be apparent from the description and claims which follow.

It has been found according to the present invention that hydrindene-sulfonamido pyrimidines, which carry an acylamino or carbamido group possess blood sugar reducing properties. The hydrindene-sulfonamido pyrimidines and their alkali salts may be used in pharmacy on the basis of their enhanced and/or prolonged anti-diabetic effects.

The novel 2-benzenesulfonamido-pyrimidine compounds of the present invention can be represented by the following formula:

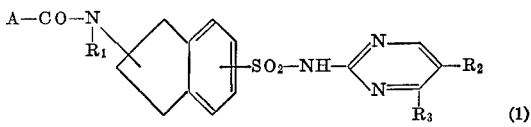

(1)

wherein A is unsubstituted or substituted alkyl, alkenyl, aryl, aralkyl, aryloxyalkyl, arylmercaptoalkyl, cycloalkyl, cycloalkenyl, thienyl, furyl, alkoxy, alkenyloxy, aralkoxy, cycloalkoxy, cycloalkylalkoxy, cycloalkenylalkoxy or a group of the formula:

wherein V and W, which may be the same or different, are each hydrogen, unsubstituted or substituted alkyl, cycloalkyl, aryl or aralkyl or taken together with the nitrogen atom to which they are attached form an unsubstituted or substituted heterocyclic ring, $R_1$ is hydrogen, lower alkyl or aralkyl, $R_2$ is alkyl, cycloalkyl, cycloalkyl-alkyl, aryl, aralkyl, alkoxy, cycloalkoxy, alkoxyalkyl, alkoxyalkoxy or alkylmercapto, which may be substituted by halogen, hydroxyl or alkyl, and $R_3$ is hydrogen or lower alkyl and $R_2$ and $R_3$ can be joined together to form a ring of 3–5 methylene groups.

A preferred group of compounds is represented by the following formula:

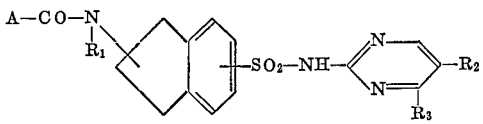

wherein A represents a phenylethyl or phenylmercaptomethyl radical and substituted or unsubstituted phenyl or thienyl wherein said substituent is halogen or alkoxy, $R_1$ represents hydrogen, $R_2$ represents alkyl, alkoxy, alkoxyalkoxy, alkoxyalkyl, alkylmercapto, cycloalkyl or cycloalkylalkyl and $R_3$ represents hydrogen or alkyl and wherein $R_2$ and $R_3$ can be joined together to form a ring of 3 to 5 methylene groups.

Illustrative of the substituents which may be present on A, V and W, there may be mentioned halogen, hydroxyl, alkyl, alkoxy, alkylmercapto, alkoxyalkoxy, aryloxy, arylmercapto and trifluoromethyl.

The invention includes not only the compounds in their free form but their alkali salts as well. The salts are prepared in the conventional manner and preferably in the form of the sodium, potassium, and ammonium salts. Salt formation takes place by virtue of the fact that the NH group directly adjacent to the $SO_2$ group exhibits a strongly acid effect due to the vicinity of the said $SO_2$ group and therefore in an alkaline medium a proton is split off and the salt formed.

Salts of this type and particularly of sulfonyl ureas are known and have been described, for example, in Netherlands Pat. 6,411,087.

The compounds of the invention can be prepared, for example, by one of the following methods:

(a) Reaction of a compound having the formula:

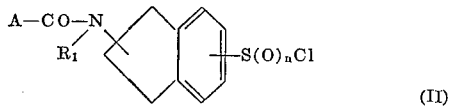

(II)

wherein A and R₁ have the meaning given above and n is 0, 1 or 2, with a 2-amino-pyrimidine having the formula:

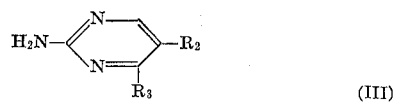

(III)

in which R₂ and R₃ have the meanings given above. The product thus obtained may be oxidized to the corresponding sulfonamide, if necessary.

(b) Reaction of a hydrindene-sulfonyl-guanidine of the formula:

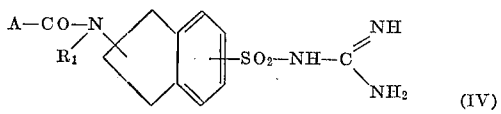

(IV)

in which A and R₁ have the significance previously assigned, with a compound having one of the following formula:

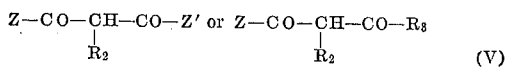

(V)

wherein R₂ and R₃ have the significance previously assigned and Z and Z' each represent hydrogen or alkoxy, or with a functional derivative thereof. Thereafter, if the pyrimidine obtained is hydroxylated in the 4- and/or 6-position, it is converted into the corresponding halogen compound and the latter subsequently subjected to a reductive dehalogenation in order to produce the desired pyrimidine.

(c) Reaction of a compound of the formula:

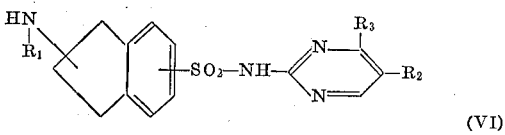

(VI)

in which R₁, R₂ and R₃ have the meanings given above, with a reactive derivative of an acid of the formula A.COOH, in which A has the same meaning as set out above.

(d) Reaction of a sulfonamide of the formula:

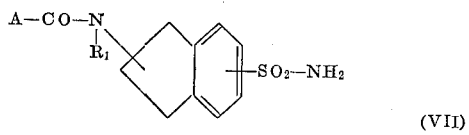

(VII)

in which A and R₁ have the meanings given above, with a pyrimidine derivative of the formula:

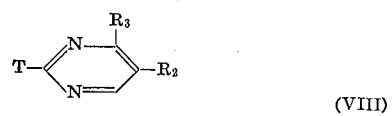

(VIII)

in which R₂ and R₃ have the meanings given above and T is a reactive ester group or a low molecular trialkyl-ammonium group.

The reaction of compounds (II) and (III) is advantageously carried out in an inert solvent in the presence of a base, preferably pyridine or trimethylamine. However, it is also possible to carry out the reaction with an excess of the amino-pyrimidine in order to bind the hydrogen chloride formed by the reaction. The subsequent oxidation of the sulfenamide or sulfinamide to the desired sulfonamide is carried out in the usual manner, for example, by treatment with hydrogen peroxide, potassium permanganate or nitric acid.

The hydrindene-sulfonyl-guanidines (IV) used as starting materials can be obtained, for example, by melting together the appropriate hydrindene-sulfonamide with guanidine carbonate. The subsequent condensation of the compound (IV) with the β-dicarbonyl compound (V) can be carried out, for example, by means of an alkali metal alcoholate in alcohol. The β-dicarbonyl compounds (V) are in this connection used either in free form or in the form of functional derivatives thereof, such as in the form of the acetal. They can, however, be prepared in a "one pot process," by Vilsmeier's method, from aldehyde acetals or ketals or from the corresponding enamines, inorganic acid chlorides and dialkyl formamides. If, instead of the dicarbonyl compounds, there are used the corresponding substituted malonic acid diesters, malonic ester aldehydes, β-keto esters of their functional derivatives, then the hydroxyl groups present in the 4- and/or 6-position of the pyrimidine ring must subsequently be replaced by chlorine as for example by treatment with an inorganic acid chloride. The chlorine can then be readily removed reductively with, for example, zinc dust.

The acylation of the compounds (VI) is carried out in the conventional manner, for example, by reaction with an appropriate acid, or with a reactive derivative thereof, as for example, with an acid halide, preferably in the presence of an acid acceptor.

If A, in the final product, is to represent a substituted hydroxyl group, then it is advantageous to start from a chlorocarbonic acid ester or from the corresponding orthocarbonic acid ester. The substituent

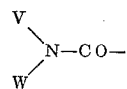

can be introduced by reaction with a carbamic acid halide or with the corresponding isocyanate. However, the compounds (VI) can also first be reacted with phosgene and the intermediate thus obtained then reacted with an appropriate alcohol or with an amine of the formula V.NH.W, in which V and W have the meanings given above.

As starting materials of Formula VIII, it is particularly preferred to use 2-halo-pyrimidines. These can be obtained, for example, by the reaction of a 2-hydroxy-pyrimidine with phosphorus oxychloride.

The condensation with the hydrindene-sulfonamide (VII) is preferably carried out in the presence of a base, such as potassium carbonate. Instead of the 2 - halo-pyrimidines, the corresponding trialkyl-ammonium-pyrimidines can also be reacted with the sulfonamides to give the desired hydrindene-sulfonamido-pyrimidines, the corresponding trialkylamines being thereby split off.

The particularly preferred physiologically compatible salts are the alkali metal, alkaline earth metal and ammonium salts. These can be prepared as noted above in the conventional manner, for example, by reaction with a solution of an alkali metal hydroxide, such as sodium hydroxide or with an aqueous solution of ammonia or of the corresponding carbonates.

The following examples serve to illustrate the invention but are not intended to limit it thereto.

EXAMPLE 1

2-(5-chloro-2-methoxy-benzamino)-N-[5-propoxy-pyrimidinyl-(2)]-hydrindene-5-sulfonamide 3.2 g. 2-(5-chloro - 2 - methoxy-benzamino)-hydrindene - 5 - sulfochloride (M.P. 133–135° C.) were added portionwise, with stirring and cooling, to a solution of 1.23 g. 2-amino - 5 - propoxy-pyrimidine (M.P. 73–74° C.) in 5 ml. anhydrous pyridine. The reaction mixture was allowed to stand overnight and was thereafter heated for 2 hours on a steam bath. After cooling, the reaction mixture was poured into 50 ml. water and the precipitated crude product which had formed filtered off with suction. For purification purposes, the crude product was dissolved in a dilute solution of sodium hydroxide, treated with activated charcoal, filtered and again precipitated by the addition of dilute hydrochloric acid. The resultant product was thereafter recrystallized from methanol. There were thusly obtained 3.1 g. (75% of theory) 2-(5-chloro - 2 - methoxy-benzamino)-N-[5-propoxy-pyrimidinyl-(2)]-hydrindene - 5 - sulfonamide, which had a melting point of 122–124° C.

The 2-(5-chloro - 2 - methoxy-benzamino)-hydrindene-5-sulfochloride (M.P. 133° C.) used as starting material was prepared by the sulfochlorination of 2-(5-chloro-2-methoxy-benzamino)-hydrindene (M.P. 124° C.).

The following compounds were obtained in an analogous manner:

2-(5-chloro - 2 - methoxy-benzamino)-N-[5-propyl-pyrimidinyl-(2)]-hydrindene - 5 - sulfonamide: for purification, this compound was dissolved in a dilute solution of sodium hydroxide, treated with activated charcoal, filtered, reprecipitated by the addition of dilute hydrochloric acid and recrystallized from methanol; M.P. 138° C.

2-(5-chloro - 2 - methoxy-benzamino)-N-[5-isobutyl-pyrimidinyl-(2)]-hydrindene - 5 - sulfonamide: the product was dissolved in a dilute solution of sodium hydroxide, reprecipitated with hydrochloric acid and subsequently extracted with hot ethanol; M.P. 122–124° C.

2-(5-chloro - 2 - methoxy-benzamino)-N-[5 - cyclohexylmethyl-pyrimidinyl - (2)] - hydrindene - 5 - sulfonamide: for purification, the product was dissolved in a dilute solution of sodium carbonate, treated with activated charcoal, filtered, reprecipitated with dilute hydrochloric acid and thereafter recrystallized from isopropanol; M.P. 174–176° C.

2-(5-chloro - 2 - methoxy-benzamino)-N-[5,6,7,8-tetrahydroquinazolinyl - (2)] - hydrindene - 5 - sulfonamide: the crude product was dissolved in a dilute solution of sodium hydroxide, treated with activated charcoal, filtered and precipitated with dilute hydrochloric acid. After recrystallization from methanol, the product was again dissolved in a dilute solution of sodium hydroxide and reprecipitated with dilute hydrochloric acid; M.P. 122° C.

2-(5-chloro - 2 - methoxy-benzamino)-N-[5-($\beta$-methoxy-ethoxy)-pyrimidinyl - (2)] - hydrindene - 5 - sulfonamide: for purification, the crude product was dissolved in a dilute solution of sodium hydroxide, treated with activated charcoal, filtered and reprecipitated with dilute hydrochloric acid and thereafter recrystallized from methanol; M.P. 108° C.

2 - (ethoxy-carbonylamino)-N-[5-isobutyl-pyrimidinyl-(2)]-hydrindene - 5 - sulfonamide: for purification, the crude product was dissolved in a dilute solution of sodium carbonate, treated with activated charcoal, filtered, reprecipitated with dilute hydrochloric acid and thereafter recrystallized from ethyl acetate; M.P. 160–161° C. The 2-(ethoxy-carbonylamino)-hydrindene - 5 - sulfochloride (M.P. 72–74° C.) used as starting material was obtained by the sulfochlorination of 2-(ethoxy-carbonylamino)-hydrindene (M.P. 68° C.).

2-(ethoxy-carbonylamino)-N-[5 - ethoxy-pyrimidinyl-(2)]-hydrindene-5-sulfonamide: for purification, the crude product was dissolved in a dilute solution of sodium hydroxide, precipitated with dilute hydrochloric acid and recrystallized from ethanol; M.P. 165° C.

2-(5-chloro - 2 - ethoxy-benzamino)-N-[4-methyl-5-isobutyl-pyrimidinyl - (2)] hydrindene - 5 - sulfonamide: for purification, the crude product was dissolved in a dilute solution of sodium hydroxide, treated with activated charcoal and reprecipitated with dilute hydrochloric acid. After repeating this purification process, the product had a melting point of 105–108° C. The 2-(5-chloro - 2 - ethoxy-benzamino)-hydrindene-5-sulfochloride (M.P. 60–65° C.) which was used as starting material was obtained by the sulfochlorination of 2-(5-chloro - 2 - ethoxy-benzamino)-hydrindene (M.P. 128° C.).

2-(5-bromo - 2 - methoxy-benzamino)-N-[5-propoxy-pyrimidinyl - (2)] - hydrindene - 5 - sulfonamide: for purification, the crude product was dissolved in a dilute solution of sodium hydroxide, treated with activated charcoal, again precipitated with dilute hydrochloric acid and recrystallized from methanol. The product was thereafter again dissolved in a dilute solution of sodium hydroxide and reprecipitated with dilute hydrochloric acid; M.P. 133–134° C. The 2-(5-bromo - 2 - methoxy-benzamino)-hydrindene - 5 - sulfochloride (M.P. 128–129° C.) used as starting material, was obtained by the sulfochlorination of 2-(5-bromo - 2 - methoxy)-hydrindene (M.P. 121–123° C.).

2-(5-bromo - 2 - methoxy-benzamino)-N-[5-propyl-mercapto-pyrimidinyl-(2)]-hydrindene - 5 - sulfonamide: the crude product was purified by dissolving it in a dilute solution of sodium hydroxide, treating with activated charcoal, filtering, precipitating with dilute hydrochloric acid, recrystallizing from methanol and repeating the dissolving and precipitating steps; M.P. 110° C.

2-(N-methyl - 5 - chloro - 2 - methoxy-benzamino)-N-[5-isobutyl-pyrimidinyl-(2)]-hydrindene - 5 - sulfonamide: for purification, the crude product was dissolved in a dilute solution of sodium carbonate, treated with activated charcoal, precipitated out with dilute hydrochloric acid and recrystallized from ethanol/water; M.P. 130–134° C. The oily 2 - (N-methyl - 5 - chloro-2-methoxy-benzamino)-hydrindene - 5 - sulfochloride used as starting material was obtained by the sulfochlorination of 2-(N-methyl - 5 - chloro - 2 - methoxy-benzamino)-hydrindene (M.P. 114–116° C.). This, in turn, was obtained by the reduction of 2-formylamino-hydrindene (M.P. 73–74° C.) to 2-N-methylamino-hydrindene (B.P. 67–70° C./0.1 mm. Hg) followed by acylation.

EXAMPLE 2

2-(indoline-1-carbonylamino)-N-[5-isobutyl-pyrimidinyl-(2)]-hydrindene-5-sulfonamide 2 g. 2-amino-N-[5-isobutyl-pyrimidinyl-(2)]hydridene-5-sulfonamide were dissolved in 3.4 ml. 2 N sodium hydroxide solution and 5 ml. water and mixed dropwise with a solution of 1.2 g. indoline-1-carboxylic acid chloride in 10 ml. methylene chloride. After the reaction mixture had been stirred for a short time, the methylene chloride was evaporated off, the precipitated material filtered off with suction, dissolved in a dilute solution of sodium carbonate, filtered and again precipitated by the addition of dilute hydrochloric acid. There were thusly obtained 1.7 g. 2-(indoline-1-carbonylamino-N-[5-isobutyl-pyrimidinyl-(2)]-hydrindene-5-sulfonamide (59.8% of theory), which had a melting point of 247–249° C.

The 2 - amino-N-[5-isobutyl-pyrimidinyl-(2)]-hydrindene-5-sulfonamide (M.P. 235–240° C.) used as starting material was obtained by the alkaline hydrolysis of 2-(ethoxycarbonylamino) - N - [5 - isobutyl-pyrimidinyl-(2)]-hydrindene-5-sulfonamide.

The following compounds were obtained in an analogous manner:

2-(cyclohexane-carbonylamino) - N - [5 - isobutyl-pyrimidinyl-(2)]-hydrindene - 5 - sulfonamide: for purification, the crude product was dissolved in a dilute solution of sodium carbonate, filtered, precipitated with dilute hydrochloric acid, filtered off with suction and recrystallized from isopropanol; M.P. 190° C.

2-(m-toluoylamino) - N - [5 - isobutyl-pyrimidinyl-(2)]-hydrindene - 5 - sulfonamide: for purification, the crude product was dissolved in a dilute solution of sodium carbonate, filtered, precipitated with dilute hydrochloric acid, filtered off with suction and recrystallized from ethanol; M.P. 193° C.

2-(m-chlorobenzamino) - N - [5-isobutyl-pyrimidinyl-(2)] - hydrindene-5-sulfonamide: for purification, the crude product was dissolved in a dilute solution of sodium carbonate, filtered, precipitated with dilute hydrochloric acid, filtered off with suction and recrystallized from methanol; M.P. 213–215° C.

2-(phenylmercapto-acetamino) - N - [5 - isobutyl-pyrimidinyl-(2)]-hydrindene - 5 - sulfonamide: for purification, the crude product was dissolved in a dilute solution of sodium carbonate, filtered, precipitated with dilute hydrochloric acid, filtered off with suction and recrystallized from isopropanol; M.P. 138–140° C.

2-[3-methoxy-thenoyl-(2)-amino] - N - [5-isobutyl-pyrimidinyl-(2)]-hydrindene - 5 - sulfonamide: for purification, the crude product was dissolved in a dilute solution of sodium carbonate, filtered, precipitated with dilute hydrochloric acid, filtered off with suction and recrystallized from isopropanol; M.P. 130–132° C.

2-[furoyl-(2)-amino] - N - [5-isobutyl-pyrimidinyl-(2)] - hydrindene-5-sulfonamide: for purification, the crude product was dissolved in a dilute solution of sodium carbonate, filtered, precipitated with dilute hydrochloric acid, filtered off with suction and recrystallized from ethanol; M.P. 194–195° C.

2-(phenoxy-acetylamino) - N - [5-isobutyl-pyrimidinyl-(2)] - hydrindene-5-sulfonamide: for purification, the crude product was dissolved in a diluted solution of sodium carbonate, filtered, precipitated with dilute hydrochloric acid, filtered off with suction and recrystallized from methanol; M.P. 137–138° C.

2-(2-methoxy-5-methyl-benzamino) - N - [5-ethoxy-pyrimidinyl-(2)]-hydrindene - 5 - sulfonamide: for purification, the crude product was dissolved in a dilute solution of sodium carbonate, filtered, precipitated with dilute hydrochloric acid, filtered off with suction and recrystallized from ethanol; M.P. 214–216° C. The 2-amino-N-[5-ethoxy-pyrimidinyl-(2)]-hydrindene - 5 - sulfonamide (M.P. 232° C.) which was used as starting material was obtained by the alkaline hydrolysis of 2-(ethoxy-carbonylamino)-N-[5-ethoxy-pyrimidinyl - (2)] - hydrindene-5-sulfonamide.

EXAMPLE 3

2-(N'-methyl-N'-o-tolylureido)-N-[5-isobutyl-pyrimidinyl-(2)]-hydrindene-5-sulfonamide 0.93 g. N'-methyl-N'-o-tolyl-carbamoyl chloride were added to 1.7 g. 2-amino-N-[5-isobutyl-pyrimidinyl-(2)]-hydrindene-5-sulfonamide, dissolved in 10 ml. anhydrous pyridine. The reaction mixture was allowed to stand overnight at ambient temperature, then heated for one hour on a steam bath and, after cooling, poured into water. The resultant precipitated material was dissolved in a dilute solution of sodium carbonate, filtered over activated charcoal and again precipitated by the addition of dilute hydrochloric acid. Following recrystallization from isopropanol, there were obtained 1.25 g. (51.5% of theory) 2-(N'-methyl - N' - o-tolylureido)-N-[5-isobutyl-pyrimidinyl-(2)]-hydrindene-5-sulfonamide, having a melting point of 194–195° C.

The following compounds were obtained in an analogous manner:

2 - (o-methoxy-benzamino)-N-[5-isobutyl-pyrimidinyl-(2)] - hydridene-5-sulfonamide: the precipitated material was dissolved in a dilute solution of sodium carbonate, filtered over activated charcoal and again precipitated out by the addition of dilute hydrochloric acid. The product was thereafter recrystallized from propanol/water. The product contains 1 mol water of crystallization; M.P. 107° C. 2-[3-chloro-thenoyl-(2)-amino]-N-[5 - isobutyl-pyrimidinyl-(2)]-hydrindene - 5 - sulfonamide: the precipitated material was dissolved in a dilute solution of sodium carbonate, filtered over activated charcoal and again precipitated out by the addition of dilute hydrochloric acid. Thereafter it was recrystallized from isopropanol; M.P. 159–161° C.

EXAMPLE 4

2-(hydrocinnamoylamino) - N - [5-isobutyl-pyrimidinyl-(2)]-hydrindene-5-sulfonamide 2.3 g. 2-hydrocinnamoylamino-hydrindene-5-sulfonamide, 1.15 g. 2-chloro-5-isobutyl-pyrimidine and 0.9 g. potassium carbonate were melted at 190° C. After dissolving in a dilute solution of sodium carbonate, followed by reprecipitation with dilute hydrochloric acid and recrystallization from ethyl acetate, the product had a melting point of 202–204° C.

EXAMPLE 5

2-(3-trifluoromethyl-benzamino)-N-[5-isobutyl-pyrimidinyl-(2)]-hydrindene-5-sulfonamide Using a procedure analogous to that described in Example 2, starting from 2-amino-N-[5-isobutyl-pyrimidinyl-(2)]-hydrindene-5-sulfonamide and 3 - trifluoromethyl-benzoyl chloride, there was obtained, in a yield of 58% of theory, 2-(3-trifluoromethyl-benzamino)-N-[5-isobutyl pyrimidinyl-(2)]-hydrindene-5-sulfonamide, which had a melting point of 206–209° C.

EXAMPLE 6

2-(m-fluorobenzamino)-N-[5-isobutyl-pyrimidinyl-(2)]-hydrindene-5-sulfonamide 1.73 g. 2-amino-N-[5-isobutyl-pyrimidinyl-(2)]-hydrindene-5-sulfonamide were dissolved in 2.5 ml. 2 N sodium hydroxide solution and 5 ml. water and mixed dropwise with a solution of 0.87 g. m-fluorobenzoyl chloride in 10 ml. methylene chloride. After stirring the reaction mixture for a short period of time, the methylene chloride was evaporated off, the precipitated material separated by suction filtering, washed with ether, dissolved in a dilute solution of sodium hydroxide, the solution treated with activated charcoal and the material precipitated out again with dilute hydrochloric acid. For further purification, it was recrystallized from methanol. There were thusly obtained 1.45 g. (62% of theory) 2-(m-fluorobenzamino)-N-[5-isobutyl-pyrimidinyl-(2)]-hydrindene - 5 - sulfonamide, which had a melting point of 120–124° C.

The following compounds were obtained in an analogous manner:

2-(isovalerylamino - N - [5-isobutyl-pyrimidinyl-(2)]-hydrindene-5-sulfonamide: for purification, the crude product was dissolved in a dilute solution of sodium hydroxide, the solution treated with activated charcoal and again precipitated out with dilute hydrochloric acid, redissolved in a dilute solution of sodium hydroxide and once more precipitated out of solution by passing in carbon dioxide. The product was finally recrystallized from ethanol; M.P. 180–183° C.

2-[β-(5-chloro-2-methoxy - phenyl)-propionylamino]-N-[5-isobutyl-pyrimidinyl-(2)]-hydrindene - 5 - sulfonamide: for purification, the crude product was dissolved in a dilute solution of sodium hydroxide, the solution was treated with activated charcoal and the material again precipitated out by passing in carbon dioxide. Thereafter, it was recrystallized twice from benzene/ligroin; M.P. 118–122° C.

2-benzyloxycarbonylamino - N - [5-isobutyl-pyrimidinyl-(2)]-hydrindene-5-sulfonamide: for purification, the crude product was dissolved in a dilute solution of sodium hydroxide, treated with activated charcoal and the material precipitated out again with dilute hydrochloric acid; it was thereafter recrystallized from ethanol; M.P. 93–95° C.

EXAMPLE 7

2-(5-chloro-2-methoxy-benzamino)-N-[5-cyclohexyloxy-pyrimidinyl-(2)]-hydrindene-5-sulfonamide 3.85 g. 2-(5-chloro-2-methoxy-benzamino)-hydrindene 5-sulfochloride were added portionwise, while stirring and with ice cooling, to 2.2 g. 2-amino-5-cyclohexyloxy-pyrimidine hydrochloride (M.P. 195° C., decomp.) in 7 ml. anhydrous pyridine. The reaction mixture was stirred for a further hour at ambient temperature and thereafter heated for 2 hours on a steam bath. After cooling, the reaction mixture was poured into 50 ml. dilute hydrochloric acid and the precipitated crude product filtered off with suction. For purification, the product was dissolved in a dilute solution of sodium hydroxide, the solution treated with activated charcoal and the compound again precipitated using dilute hydrochloric acid. Thereafter, it was recrystallized three additional times from ethanol, with the addition of ethylene chloride. There were thusly obtained 2.2 g. 2-(5-chloro-2-methoxy-benzamino) - N - [5-cyclohexyloxy-pyrimidinyl-(2)]-hydrindene-5-sulfonamide (41% of theory), which had a melting point of 186–188° C.

The following compounds were obtained in an analogous manner:

2-(5-chloro - 2 - methoxy-benzamino)-N-[5-cyclohexyl-pyrimidinyl-(2)]-hydrindene-5-sulfonamide: for purification, the crude product was dissolved in a dilute solution of sodium hydroxide, the solution treated with activated charcoal and the substance again preciptiated out with dilute hydrochloric acid; after drying, it was recrystallized from ethylene chloride; M.P. 211–214° C.

2 - (5 - chloro-2-methoxy-benzamino)-N-[5-methoxymethyl - pyrimidinyl-(2)]-hydrindene-5-sulfonamide: for purification, the crude product was dissolved in a dilute solution of sodium hydroxide, the solution treated with activated charcoal and the material again precipitated out with dilute hydrochloric acid; thereafter, it was recrystallized twice from methanol; M.P. 169–171° C.

2 - (5 - chloro - 2 - methoxy-benzamino)-N-[5-ethoxymethyl - pyrimidinyl-(2)]-hydrindene-5-sulfonamide: for purification, the crude product was dissolved in a dilute solution of sodium hydroxide, the solution treated with activated charcoal and the compound again precipitated by using dilute hydrochloric acid. Thereafter, it was again dissolved in a dilute solution of sodium hydroxide, and by the addition of a concentrated solution of sodium hydroxide, the compound was precipitated out as the sodium salt; this purification of the sodium salt was repeated twice. Thereafter, the free compound was precipitated out of a solution of the sodium salt in water by the addition of dilute hydrochloric acid thereto; M.P. 119–123° C.

2 - (5 - chloro - 2 - methoxy-benzamino)-N-[5-benzyl-pyrimidinyl-(2)]-hydrindene-5-sulfonamide: for purification, the crude product was dissolved in a dilute solution of sodium hydroxide, the solution treated with activated charcoal, and the substance again precipitated out with dilute hydrochloric acid; thereafter, the compound was recrystallized from methanol/water. The compound contained 0.5 mol water of crystallization; M.P. 169–171° C.

2 - (5 - chloro - 2-methoxy-benzamino)-N-[4-methyl-5-ethylmercaptopyrimidinyl - (2)] - hydrindene - 5-sulfonamide: for purification, the crude product was dissolved in a dilute solution of sodium hydroxide, the solution treated with activated charcoal and the sulfonamide again precipitated out with dilute hydrochloric acid. After drying, the compound was taken up in carbon tetrachloride, any impurities thereby remaining undissolved were separated off by filtration, the solvent evaporated off and the compound again dissolved in a dilute solution of sodium hydroxide and reprecipitated with dilute hydrochloric acid; M.P. 108–110° C., following sintering at 90° C.

The blood sugar reducing activities of some of the new 2-benzene-sulfonamido-pyrimidines were compared with that of the known compounds, i.e., the 2-benzene-sulfonamido-3-methoxy-ethoxy-pyrimidine and $N_1$-sulfanilyl-$N_2$-(n-butyl)-urea. The blood sugar reducing activity was measured in the rabbit following i.v. administration of the test compounds. The following compounds were employed in the tests:

(A) 2-(5-chloro-2-methoxy-benzamino)-N-[5-propoxy-pyrimidinyl-(2)]-hydrindene-5-sulfonamide (B) 2-(5-chloro-2-methoxy-benzamino)-N-[5-propyl-pyrimidinyl-(2)]-hydrindene-5-sulfonamide (O) 2-(m-chloro-benzamino)-N-[5-isobutylpyrimidinyl-pyrimidinyl-(2)]-hydrindene-5-sulfonamide (D) 2-(5-chloro-2-methoxy-benzamino)-N-[5-cyclohexyl-methyl-pyrimidinyl-(2)]-hydrindene-5-sulfonamide (E) 2-(5-chloro-2-methoxy-benzamino)-N-[5,6,7,8-tetrahydrochinazolinyl-(2)]-hydrindene-5-sulfonamide (F) 2-(5-chloro-2-methoxy-benzamino)-N-[5-($\beta$-methoxyethoxy)-pyrimidinyl-(2)]-hydrindene-5-sulfonamide (G) 2-(ethoxycarbonylamino)-N-[5-isobutylpyrimidinyl-(2)]hydrindene-5-sulfonamide (H) 2-(5-chloro-2-ethoxy-benzamino)-N-[4-methyl-5-isobutyl-pyrimidinyl-(2)]-hydrindene-5-sulfonamide (I) 2-(5-bromo-2-methoxy-benzamino)-N-[5-propoxy-pyrimidinyl-(2)]-hydrindene-5-sulfonamide (J) 2-(5-bromo-2-methoxy-benzamino)-N-[5-propyl-mercaptopyrimidinyl-(2)]-hydrindene-5-sulfonamide (K) 2-(N-methyl-5-chloro-2-methoxy-benzamino)-N-[5-isobutyl-pyrimidinyl-(2)]-hydrindene-5-sulfonamide (L) 2-(indoline-1-carbonylamino)-N-[5-isobutylpyrimidinyl-(2)]-hydrindene-5-sulfonamide (M) 2-(cyclohexancarbonylamino)-N-[5-isobutyl-pyrimidinyl-(2)]hydrindene-5-sulfonamide (N) 2-(m-toluoylamino)-N-[5-isobutylpyrimidinyl-(2)]-hydrindene-5-sulfonamide (O) 2-(m-chloro-benzamino)-N-([5-isobutylpyrimidinyl-(2)]-hydrindene-5-sulfonamide (P) 2-(phenylmercaptoacetamino)-N-[5-isobutylpyrimidinyl-(2)]-hydrindene-5-sulfonamide (Q) 2-[3-methoxy-thenoyl-(2)-amino]-N-[5-isobutylpyrimidinyl-(2)]-hydrindene-5-sulfonamide (R) 2-[furoyl-(2)-amino]-N-[5-isobutyl-pyrimidinyl-(2)]-hydrindene-5-sulfonamide (S) 2-(phenoxyacetylamino)-N-[5-isobutyl-pyrimidinyl-(2)]-hydrindene-5-sulfonamide (T) 2-(2-methoxy-5-methyl-benzamino)-N-[5-ethoxy-pyrimidinyl-(2)]-hydrindene-5-sulfonamide (U) 2-(N'-methyl-N'-o-tolylureido)-N-[5-isobutyl-pyrimidinyl-(2)]-hydrindene-5-sulfonamide (V) 2-(o-methoxy-benzamino)-N-[5-isobutylpyrimidinyl-(2)]-hydrindene-5-sulfonamide (W) 2-[3-chloro-thenoyl-(2)-amino]-N-[5-isobutyl-pyrimidinyl-(2)]-hydrindene-5-sulfonamide (X) 2-(hydrocinnamoylamino)-N-[5-isobutylpyrimidinyl-(2)]-hydrindene-5-sulfonamide (Y) 2-(3-trifluoromethyl-benzamino)-N-[5-isobutyl-pyrimidinyl-(2)]-hydrindene-5-sulfonamide (Z) 2-(m-fluorobenzamino)-N-[5-isobutyl-pyrimidinyl-(2)]-hydrindene-5-sulfonamide (AA) 2-(isovalerylamino)-N-[5-isobutyl-pyrimidinyl-(2)]-hydrindene-5-sulfonamide (BB) 2-[$\beta$-(5-chloro-2-methoxy-phenyl)-propionyl-amino]-N-[5-isobutyl-pyrimidinyl-(2)]-hydrindene-5-sulfonamide (CC) 2-(5-chloro-2-methoxy-benzamino)-N-[5-cyclohexyl-pyrimidinyl-(2)]-hydrindene-5-sulfonamide (DD) 2-(5-chloro-2-methoxy-benzamino)-N-[5-ethoxymethyl-pyrimidinyl-(2)]-hydrindene-5-sulfonamide (EE) 2-benzene-sulfonamide-5-methoxyethoxy-pyrimidine (FF) $N_1$-(sulfanilyl)-$N_2$-(n-butyl)-urea The data set out in Table I which follows represent those compounds having the relative blood sugar reducing activity of at least 80 compared to the blood sugar reducing activity of $N_1$-sulfanilyl-$N_2$-(n-butyl)-urea. The increase in activity of the compounds of the invention as compared to 2 - benzene-sulfonamido-5-methoxyethoxy pyrimidine amounted to at least 10-fold, the effective threshold dose amounted to 0.025–2.5 mg./kg. The most effective compounds of the invention which were employed in testing, i.e., 2-(5-chloro-2-methoxy-benzamino)-N-[5-propoxy-pyrimidinyl-(2)]-hydrindene-5-sulfonamide;

2-(5-chloro-2-methoxy-benzamino)-N-[5-propyl-pyrimidinyl-(2)]-hydrindene-5-sulfonamide;
2-(5-chloro-2-methoxy-benzamino)-N-[5-isobutyl-pyrimidinyl-(2)]-hydrindene-5-sulfonamide;
2-(5-chloro-2-ethoxy-benzamino)-N[4-methyl-5-isobutyl-pyrimidinyl-(2)]-hydrindene-5-sulfonamide;
2-(5-bromo-2-methoxy-benzamino)-N-[5-propoxyprimidinyl-(2)]-hydrindene-5-sulfonamide;
2-(o-methoxybenzamino)-N-[5-isobutyl-pyrimidinyl-(2)]-hydrindene-5-sulfonamide;
2-(hydrocinnamoylamino)-N-[5-isobutyl-pyrimidinyl-(2)]-hydrindene-5-sulfonamide;
2-(5-chloro-2-methoxy-benzamino)-N-[5-cyclohexyl-pyrimidinyl-(2)]-hydrindene-5-sulfonamide and
2-(5-chloro-2-methoxy-benzamino)-N-[5-ethoxymethyl-pyrimidinyl-(2)]-hydrindene-5-sulfonamide demonstrated activiting amounting to at least 50 times that of the 2 - benzene-sulfonamido-5-methoxy-ethoxypyrimidine.

TABLE I

| Compound: | Relative blood sugar reducing activity rabbit, i.v. |
|---|---|
| A | 4000 |
| B | 8000 |
| C | 8000 |
| D | 2000 |
| E | 2000 |
| F | 2000 |
| G | 200–400 |
| H | 4000 |
| I | 8000 |
| J | 2000 |
| K | 80 |
| L | 80 |
| M | 400 |
| N | 400 |
| O | 800 |
| P | 2000 |
| Q | 2000 |
| R | 800 |
| S | 400 |
| T | 800 |
| U | 80 |
| V | 8000 |
| W | 400 |
| X | 4000 |
| Y | 400 |
| Z | 800 |
| AA | 800 |
| BB | 800 |
| CC | 8000 |
| DD | 4000 |

The compounds 2 - (5 - chloro - 2 - methoxy - benzamino) - N - [5 - isobutyl-pyrimidinyl - (2)] - hydrindene - 5 - sulfonamide; 2 - (5 - bromo - 2 - methoxybenzamino) - N - [5 - propoxy - pyrimidinyl - (2)] - hydrindene - 5 - sulfonamide and 2 - (5 - chloro - 2 - methoxy-benzamino) - N - [5 - propyl - pyrimidinyl - (2)]-hydrindene-5-sulfonamide were also evaluated following oral administration. The effective threshold dose amounted to 0.1 mg./kg. The duration of the blood sugar reduction following the administration of 0.5 mg./kg. p.o. amounted to 24–55 hours. It is believed apparent that the products of the present invention are characterized by both enhanced and prolonged blood sugar reducing activity.

In normal clinical use, the compounds can be employed in both the free and the salt form. The activity of the compounds is independent of whether they are in salt form or otherwise. Salts may be prepared by any of the well-known standard methods. While the salt normally employed is the alkali salt and preferably the sodium salt, the compounds have been prepared in the form of other salts, such as potassium, ammonium, etc.

The products of this process may be combined with a pharmaceutical carrier for administration to humans in an amount to attain the desired blood sugar reducing effect. Such carriers are either solid or liquid. Exemplary of solid pharmaceutical carriers are lactose, cornstarch, mannitol, talc, etc. The compounds of this invention are mixed with a carrier and filled into hard gelatin capsules or tabletted with suitable tabletting aids, such as magnesium stearate, starch, or other lubricants, disintegrants or coloring agents. If combination with a liquid carrier is desirable, a soft gelatin capsule is filled with a slurry or other dispersion of the novel compounds in soyabean, corn or peanut oil. Aqueous suspensions or solutions are prepared for alternate, oral or parenteral administration.

The dosage of the novel compounds of the present invention for the treatment of diabetes depends in the main on the age, weight, and condition of the patient being treated. The preferable form of administration is via the oral route in connection with which dosage units containing 2–50 mg. of active compound in combination with a suitable pharmaceutical diluent is employed. One or two unit dosages are good from one to four times a day.

We claim:

1. A compound selected from the group consisting of hydrindene-sulfonylamido-pyrimidines having the formula

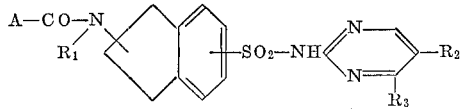

wherein

A represents a member selected from the group consisting of lower alkyl, lower alkoxy, cyclohexyl, unsubstituted or substituted phenyl, phenyl-lower alkyl, furyl and thienyl wherein the substituents are one or two of the group consisting of lower alkyl, lower alkoxy, halogen and trifluoromethyl; benzyloxy, phenyloxy-lower alkyl, phenylmercapto-lower alkyl and the group

wherein V and W each represent a member selected from the group consisting of hydrogen, lower alkyl, and phenyl which may be substituted by lower alkyl and wherein V and W taken together with the nitrogen atom to which they are attached form an indoline ring;

$R_1$ is hydrogen or lower alkyl;

$R_2$ is a member selected from the group consisting of lower alkyl, lower alkoxy, lower alkylmercapto, cyclohexyl, cyclohexyl-lower alkyl, cyclohexyloxy, lower alkoxyalkyl, lower alkoxyalkoxy and phenyl-lower alkyl; and $R_3$ is a member selected from the group consisting of hydrogen and lower alkyl, wherein $R_2$ and $R_3$ can be joined together to form a ring of 3 to 5 methylene groups;

and the pharmaceutically acceptable salts thereof.

2. A compound according to claim 1 wherein

A represents a member selected from the group consisting of phenylethyl and phenylmercaptomethyl and substituted and unsubstituted phenyl and thienyl, wherein said substituent is a member selected from the group of halogen and alkoxy;

$R_1$ is hydrogen;

$R_2$ is a member selected from the group consisting of lower alkyl, lower alkoxy, lower alkylmercapto, cyclohexyl, cyclohexyl-lower alkoxy, cyclohexyloxy, lower alkoxyalkyl, lower alkoxyalkoxy and phenyl-lower alkyl; and $R_3$ is a member selected from the group consisting of hydrogen and lower alkyl, wherein $R_2$ and $R_3$ can be joined together to form a ring of 3 to 5 methylene groups.

3. A compound according to claim 1 designated 2-(5-chloro - 2 - methoxybenzoylamino) - N - [5 - propyl-pyrimidinyl-(2)]-indane-5-sulfonamide.

4. A compound according to claim 1 designated 2-(5-chloro - 2 - methoxybenzoylamino) - N - [5 - isobutyl-pyrimidinyl-(2)]-indane-5-sulfonamide.

5. A compound according to claim 1 designated 2-(5-bromo - 2 - methoxybenzoylamino) - N - [5 - propoxy-pyrimindinyl-(2)]-indane-5-sulfonamide.

6. A compound according to claim 1 designated 2-(o-methoxybenzoylamino) - N - [5 - isobutylpyrimidinyl-(2)]-indane-5-sulfonamide.

7. A compound according to claim 1 designated 2-(5-chloro - 2 - methoxybenzoylamino) - N - [5 - cyclohexyl-pyrimidinyl-(2)]-indane-5-sulfonamide.

References Cited

UNITED STATES PATENTS 3,377,351  4/1968  Haack et al. _____ 260—256.5
3,431,263  3/1969  Priewe et al. _____ 260—256.5

ALEX MAZEL, Primary Examiner

R. J. GALLAGHER, Assistant Examiner

U.S. Cl. X.R.

260—332.2, 347.2, 543, 556; 424—251

PO-1050
(5/69)

UNITED STATES PATENT OFFICE
CERTIFICATE OF CORRECTION

Patent No. 3,565,897　　　　　　　　Dated February 23, 1971

Inventor(s) 1) Ruth Heerdt  2) Manfred Hubner  3) Kurt Stach
4) Felix Helmut Schmidt  5) Karl Muth It is certified that error appears in the above-identified patent and that said Letters Patent are hereby corrected as shown below:

Column 1, line 57

"939,698" should read --939,608--

Column 10, line 3

"(O)" should read --(C)--

Signed and sealed this 22nd day of June 1971.

(SEAL)
Attest:

EDWARD M. FLETCHER, JR.　　　　　WILLIAM E. SCHUYLER, JR.
Attesting Officer　　　　　　　　　Commissioner of Patents